(12) United States Patent
Sato et al.

(10) Patent No.: US 9,738,229 B2
(45) Date of Patent: Aug. 22, 2017

(54) CARRIER BAR AND CARRIER BAR ASSEMBLY STRUCTURE

(71) Applicant: CAR MATE MFG. CO., LTD., Tokyo (JP)

(72) Inventors: Yuichi Sato, Tokyo (JP); Daisuke Kisaka, Tokyo (JP); Hisashi Nakamura, Tokyo (JP)

(73) Assignee: CAR MATE MFG. CO., LTD., Tokyo (JP)

( * ) Notice: Subject to any disclaimer, the term of this patent is extended or adjusted under 35 U.S.C. 154(b) by 33 days.

(21) Appl. No.: 15/022,325

(22) PCT Filed: Sep. 12, 2014

(86) PCT No.: PCT/JP2014/004733
§ 371 (c)(1),
(2) Date: Mar. 16, 2016

(87) PCT Pub. No.: WO2015/040845
PCT Pub. Date: Mar. 26, 2015

(65) Prior Publication Data
US 2016/0280143 A1    Sep. 29, 2016

(30) Foreign Application Priority Data

Sep. 17, 2013  (JP) .................. 2013-191581

(51) Int. Cl.
*B60R 9/00*  (2006.01)
*B60R 9/045*  (2006.01)
(Continued)

(52) U.S. Cl.
CPC .............. *B60R 9/058* (2013.01); *B60R 9/045* (2013.01); *B60R 9/052* (2013.01)

(58) Field of Classification Search
CPC .......... B60R 9/058; B60R 9/052; B60R 9/045
(Continued)

(56) References Cited

U.S. PATENT DOCUMENTS

| 5,294,033 A | 3/1994 | Duemmler |
| 5,452,831 A * | 9/1995 | Linnhoff ................ B60R 9/058 224/320 |

(Continued)

FOREIGN PATENT DOCUMENTS

| EP | 2 492 149 A1 | 8/2012 |
| FR | 1327816 A | 5/1963 |

(Continued)

OTHER PUBLICATIONS

Nov. 25, 2014 International Search Report issued in International Patent Application No. PCT/JP2014/004733.
(Continued)

*Primary Examiner* — Adam Waggenspack
*Assistant Examiner* — Lester L Vanterpool
(74) *Attorney, Agent, or Firm* — Oliff PLC

(57) ABSTRACT

A carrier bar is provided, capable of enabling suitable assembly work of the stay and improving freedom in adjustment of stay assembly position relative to carrier bar, disclosed is a carrier bar having shell formed along longitudinal direction and hollow zones in cross-sectional structure so as to be assembled to stay by using a clamp mechanism having a head and a constricted portion to form a base carrier. Shell has assembly and positioning openings extending toward the longitudinal end of shell by using assembly opening as a basal end and having a terminated end formed by longitudinal end of shell. Assembly opening has an opening width and an opening length into which the head of clamp mechanism is insertable. Positioning opening has an opening width narrower than that of assembly open- (Continued)

ing, along which the constricted portion is slidable, and an opening length longer than that of assembly opening.

6 Claims, 15 Drawing Sheets

(51) Int. Cl.
*B60R 9/058* (2006.01)
*B60R 9/052* (2006.01)

(58) Field of Classification Search
USPC .............. 224/330, 329, 331, 319, 320, 325
See application file for complete search history.

(56) References Cited

U.S. PATENT DOCUMENTS

| | | | | |
|---|---|---|---|---|
| 5,931,359 A | * | 8/1999 | Zona | B60R 9/045 224/319 |
| 6,457,617 B1 | * | 10/2002 | Andersson | B60R 9/052 224/321 |
| 7,434,713 B2 | * | 10/2008 | Linden | B60R 9/058 224/323 |
| 8,998,046 B2 | * | 4/2015 | Moeller | B60R 9/058 224/309 |
| 9,038,874 B2 | * | 5/2015 | Poulsen | B60R 9/058 224/329 |
| 2010/0282799 A1 | * | 11/2010 | Hubbard | B60R 9/045 224/320 |
| 2013/0193177 A1 | * | 8/2013 | Poulsen | B60R 9/058 224/329 |

FOREIGN PATENT DOCUMENTS

| | | | | |
|---|---|---|---|---|
| JP | H04-325335 A | | 11/1992 | |
| JP | H09-507447 A | | 7/1997 | |
| JP | 2013-525175 A | | 6/2013 | |
| SE | EP 2492149 A1 | * | 8/2012 | ............. B60R 9/058 |

OTHER PUBLICATIONS

Dec. 16, 2015 International Preliminary Report on Patentability issued in International Patent Application No. PCT/JP2014/004733.

* cited by examiner

B-B

FIG. 15
(A)
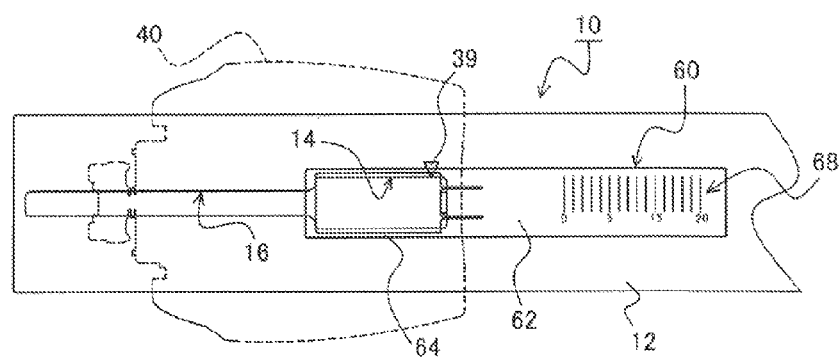
(B)
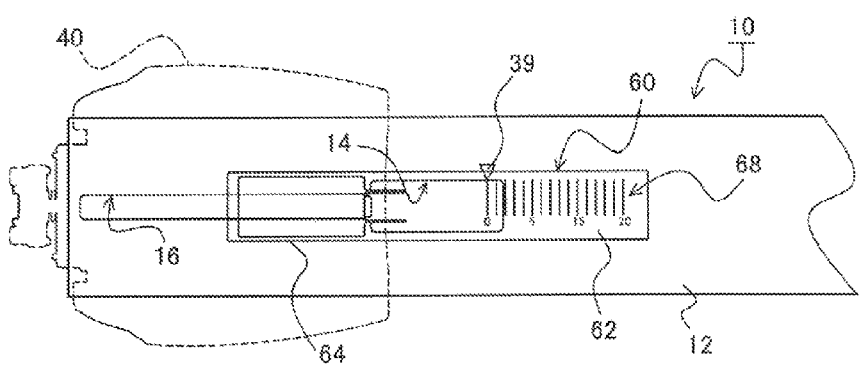
(C)
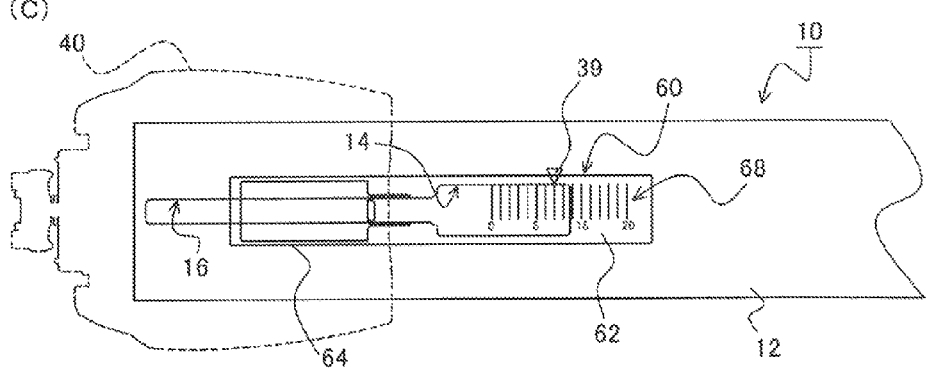

CARRIER BAR AND CARRIER BAR ASSEMBLY STRUCTURE

TECHNICAL FIELD

This invention relates to a base carrier installed to a vehicle roof, and more particularly, to a carrier bar of the base carrier and an assembly structure between the carrier bar and the stay.

BACKGROUND ART

A base carrier serving as a base of a system carrier has basic components such as a carrier bar, a stay for supporting the carrier bar, and a hook for fixing the stay to a vehicle.

The basic components such as the carrier bar, the stay, and the hook may be designed dedicatedly to a certain vehicle model. However, in order to provide versatility within a limited range, an assembly adjustment mechanism is designed to allow for a maximum size of the installable vehicle model. For example, a carrier bar discussed in Patent Literature 1 is provided with a positioning opening for assembling the stay on the stay-assembled surface (lower surface) of the carrier bar in order to enable adjustment to the stay assembly position. As a result, the stay assembly position can be adjusted through sliding within a positioning opening formation range.

However, in the carrier bar discussed in Patent Literature 1, the positioning opening is formed inwardly from the longitudinal end of the carrier bar. For this reason, the stay is assembled and fixed by inserting it from the end side of the carrier bar. If such an assembly structure is employed, an allowable range of the insertion angle of the stay is widened. For this reason, when the stay is inserted into the positioning opening, sloping or twisting may be generated. Sometimes, insertion may be insufficient, or the carrier bar may be erroneously assembled to a non-standard stay.

In view of those problems, as discussed in Patent Literature 2, a carrier bar and its assembly structure have been developed to suitably perform the stay assembly work. In the carrier bar discussed in Patent Literature 2, the positioning opening provided for assembling the stay is not formed in the end portion of the carrier bar. Specifically, the positioning opening is provided inwardly from the longitudinal end of the carrier bar. In addition, an opening for inserting the clamp mechanism of the stay is provided more inwardly from the positioning opening. This opening communicates with the positioning opening, so that the assembly work is completed by inserting the clamp mechanism of the stay from the opening, sliding it toward the positioning opening, and fixing the stay by using the clamp mechanism.

The positioning opening of the carrier bar discussed in Patent Literature 2 has a length equal to the longitudinal length of the opening, that is, the length of the clamp mechanism of the stay. In addition, the positioning opening is not limitedly formed in the end portion of the carrier bar, and the end member serves as a stopper. For this reason, a position where the stay stops after the clamp mechanism of the stay is inserted from the opening and slides along the notch toward the end side of the carrier bar corresponds to the assembly position.

In this structure of the carrier bar, the opening is formed to match the clamp mechanism of the stay as seen in a plan view. Therefore, it is possible to prevent the stay from being assembled in a sloped state or a non-standard stay from being erroneously installed. In addition, a position where the stay slides and finally stops by using the end member of the carrier bar as a stopper can be used as the assembly position. Therefore, it is possible to prevent insufficient insertion.

CITATION LIST

Patent Literatures

[Patent Literature 1] JP 9-507447 W
[Patent Literature 2] JP 2013-525175 W

SUMMARY OF INVENTION

It is definitely conceived that the carrier bar discussed in Patent Literature 1 can prevent the stay from being erroneously assembled. However, in the configuration discussed in Patent Literature 2, when the entire length of the trench provided in the assembly surface is set to be equal to that of the prior art, an adjustable range of the stay assembly position is reduced disadvantageously. In particular, in the carrier bar having the configuration discussed in Patent Literature 1, the stay assembly position is nearly constant.

In view of the aforementioned problems, it is therefore an object of the present invention to provide a carrier bar and a carrier bar assembly structure, by which a stay assembly work can be suitably performed, and freedom in adjustment of the stay assembly position relative to the carrier bar can be improved.

According to an aspect of the present invention, there is a carrier bar including: a shell formed along a longitudinal direction; and hollow zones formed in a cross-sectional structure, the carrier bar being assembled with a stay by using a clamp mechanism having a head and a constricted portion to form a base carrier, wherein the shell has an assembly opening and a positioning opening, the positioning opening extends toward a longitudinal end or a longitudinal center of the shell by using the assembly opening as a basal end, a terminated end of the positioning opening is formed by the longitudinal end of the shell when the positioning opening extends toward the longitudinal end, the terminated end of the positioning opening is formed by the longitudinal center of the shell when the positioning opening extends toward the longitudinal center of the shell, the assembly opening has an opening width and an opening length into which the head of the clamp mechanism is insertable, and the positioning opening has an opening width, narrower than that of the assembly opening, along which the constricted portion is slidable, and an opening length longer than that of the assembly opening.

The carrier bar described above may further include a lid that seals a part of the assembly opening and the positioning opening after the carrier bar is installed to the stay. In this configuration, even when the length of the positioning opening increases, it is possible to suppress an increasing irregular wind flow and noise generated thereby.

In the carrier bar described above, the lid may be arranged to extend from an opening end of the assembly opening that does not communicate with the positioning opening toward a side of the hollow portion that does not seal the assembly opening in the longitudinal direction of the shell, and the lid may slide to seal the assembly opening and the positioning opening. In this configuration, it is possible to previously dispose the lid in the shell of the carrier bar. For this reason, it is possible to prevent missing or losing of the lid.

In the carrier bar described above, the lid may have an engagement portion engaged to the clamp mechanism, and the lid may be slide along with the clamp mechanism inserted into the assembly opening. In this configuration, the lid automatically slides when the stay is assembled to the carrier bar so as to seal the assembly opening or the positioning opening. Therefore, it is possible to reliably seal the openings without missing operation.

In the carrier bar described above, the lid and the shell are provided with marks for recognizing where the lid is placed in positioning means as the lid slides. In this configuration, it is possible to relatively recognize where the lid is placed in the shell. Therefore, it is possible to specifically recognize the stay assembly position when the stay is assembled.

According to another aspect of the present invention, there is provided a carrier bar assembly structure including; a carrier bar having a shell and a lid; and a stay having a clamp mechanism, the shell being formed along a longitudinal direction and having an assembly opening and a positioning opening provided to extend toward a longitudinal end or a longitudinal center of the shell, a terminated end of the positioning opening being formed by the longitudinal end of the shell when the positioning opening extends toward the longitudinal end, the terminated end of the positioning opening being formed by the longitudinal center of the shell when the positioning opening extends toward the longitudinal center of the shell, the lid having an engagement portion engaged to the clamp mechanism inserted into the assembly opening, the lid being arranged oppositely to a direction of forming the positioning opening of the shell with respect to the assembly opening to seal a part of the assembly opening and the positioning opening by sliding toward the positioning opening, the assembly opening having an opening width and an opening length into which the head of the clamp mechanism is insertable, the positioning opening having an opening width, narrower than that of the assembly opening, along which the constricted portion is slidable, and an opening length longer than that of the assembly opening, the clamp mechanism having a head that is insertable into the assembly opening on a carrier bar assembly surface that supports the carrier bar and has a width wider than that of the positioning opening, and a constricted portion that is allowed to intrude into the positioning opening, wherein the clamp mechanism is engaged with the engagement portion of the lid when it is inserted into the assembly opening, so that the stay slides toward the positioning opening, and sliding of the lid is achieved.

In the carrier bar assembly structure described above, the lid and the shell may be provided with marks for recognizing where the stay is placed with respect to positioning means as the lid slides. As a result, it is possible to specifically recognize the stay assembly position relative to the carrier bar.

Using the carrier bar having the aforementioned characteristics, it is possible to suitably perform a stay assembly work and improve freedom in adjustment of the stay assembly position relative to the carrier bar.

BRIEF DESCRIPTION OF DRAWINGS

FIGS. 12A and 12B are diagrams illustrating sliding of the lid when the carrier bar and the stay according to an embodiment are engaged with each other, in which FIG. 12A illustrates an engagement initiation position, and FIG. 12B illustrates a sliding state;

FIGS. 15A, 15B, and 15C are diagrams illustrating an exemplary configuration of a scale for recognizing a relative position of the lid against the carrier bar.

DESCRIPTION OF EMBODIMENTS

A description will now be made in detail for a carrier bar and a carrier assembly structure according to an embodiment of the invention with reference to the accompanying drawings.

Figure 1:
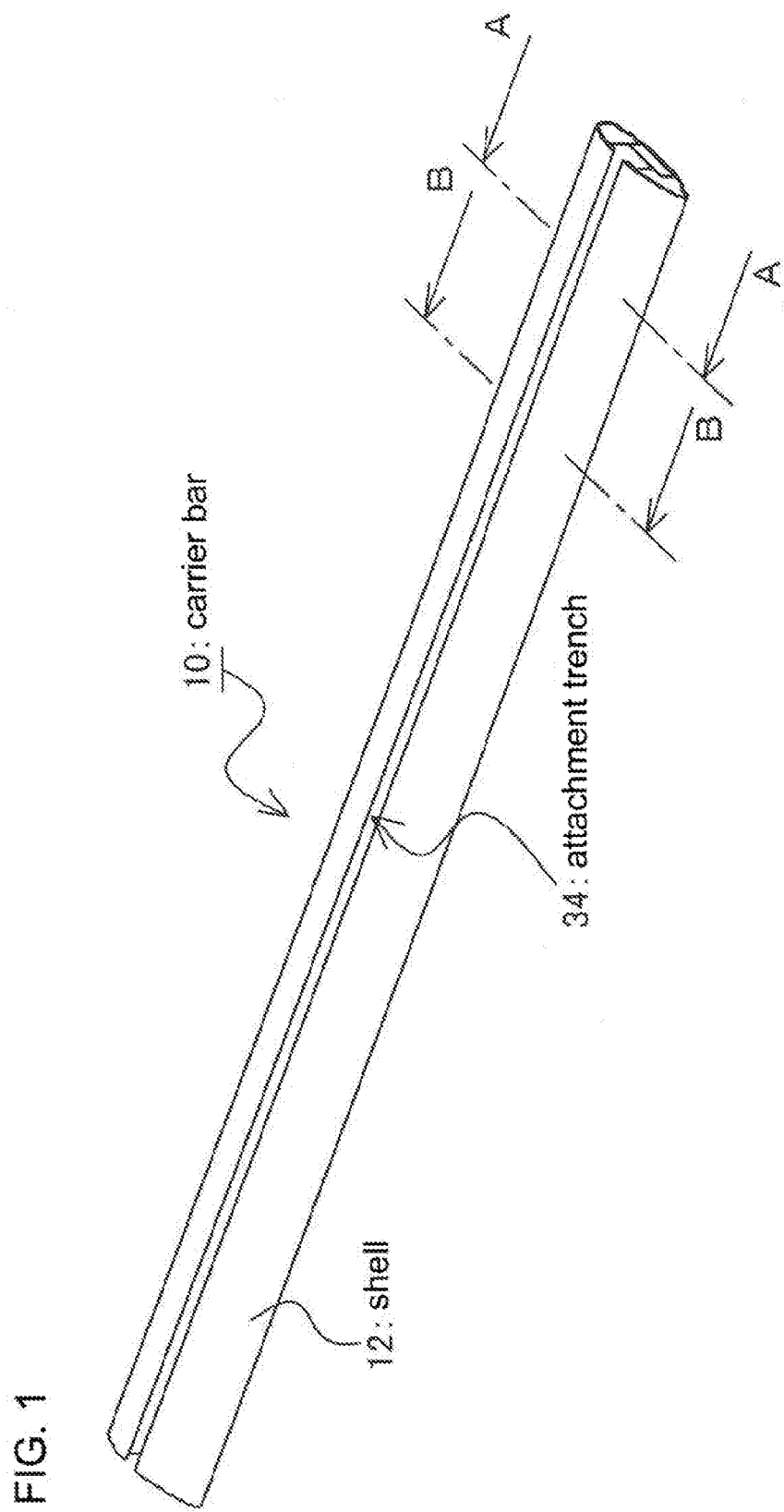
FIG. 1 is a perspective view illustrating a carrier bar according to an embodiment by focusing on a plane side of the carrier bar.
Figure 2:
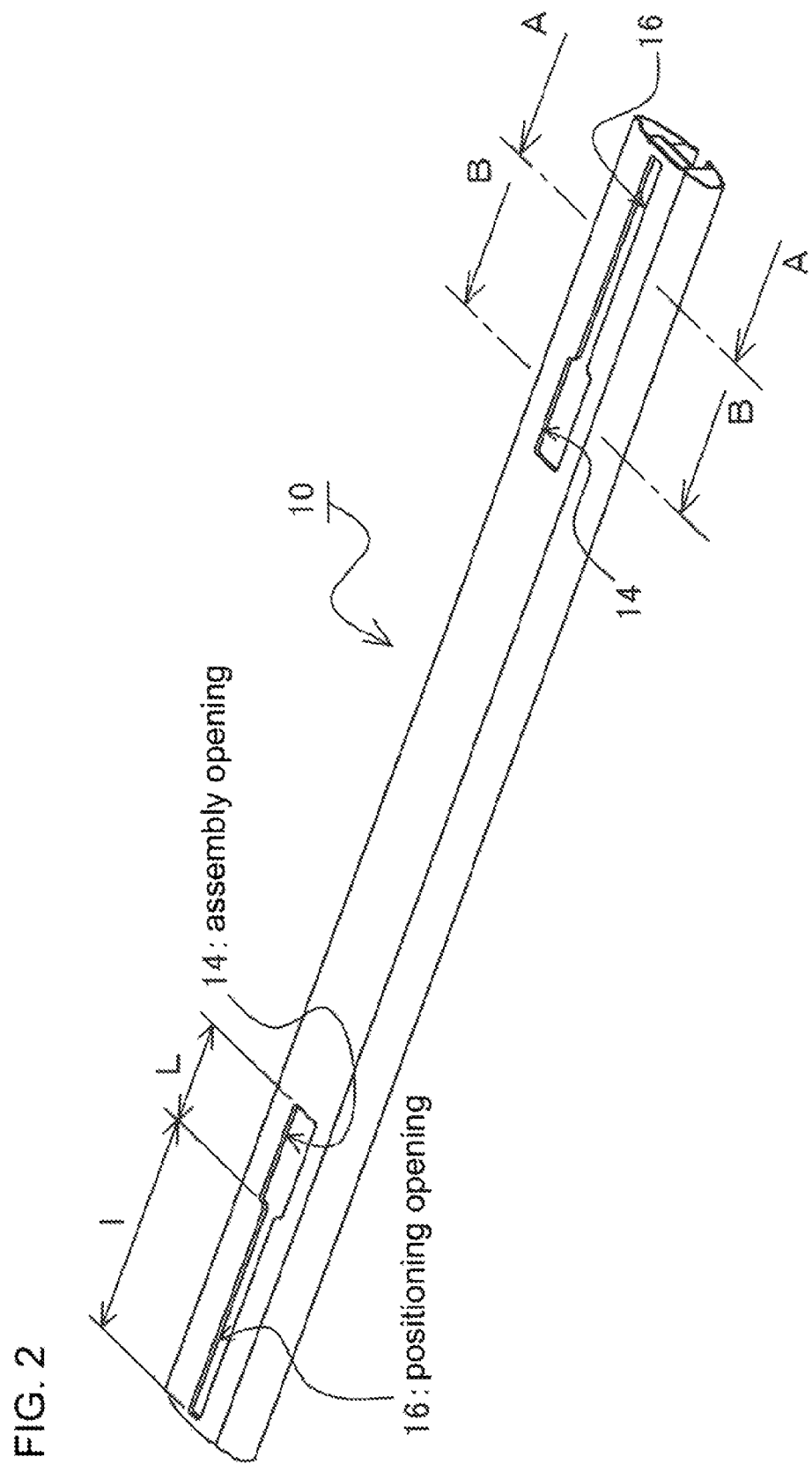
FIG. 2 is a perspective view illustrating a carrier bar according to an embodiment by focusing on a bottom side of the carrier bar.
Figure 3:
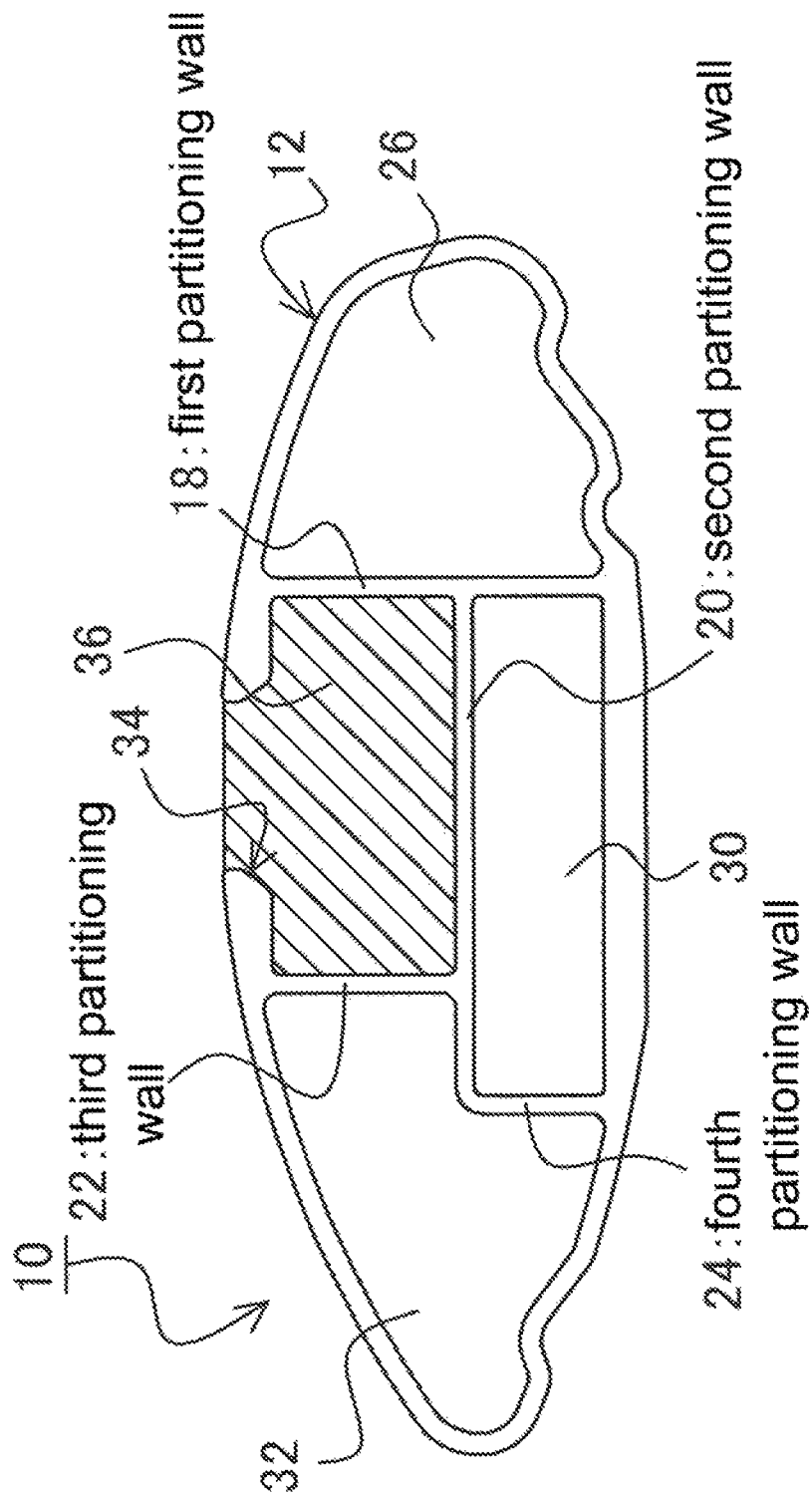
FIG. 3 is a side view illustrating a carrier bar according to an embodiment.
Figure 4:
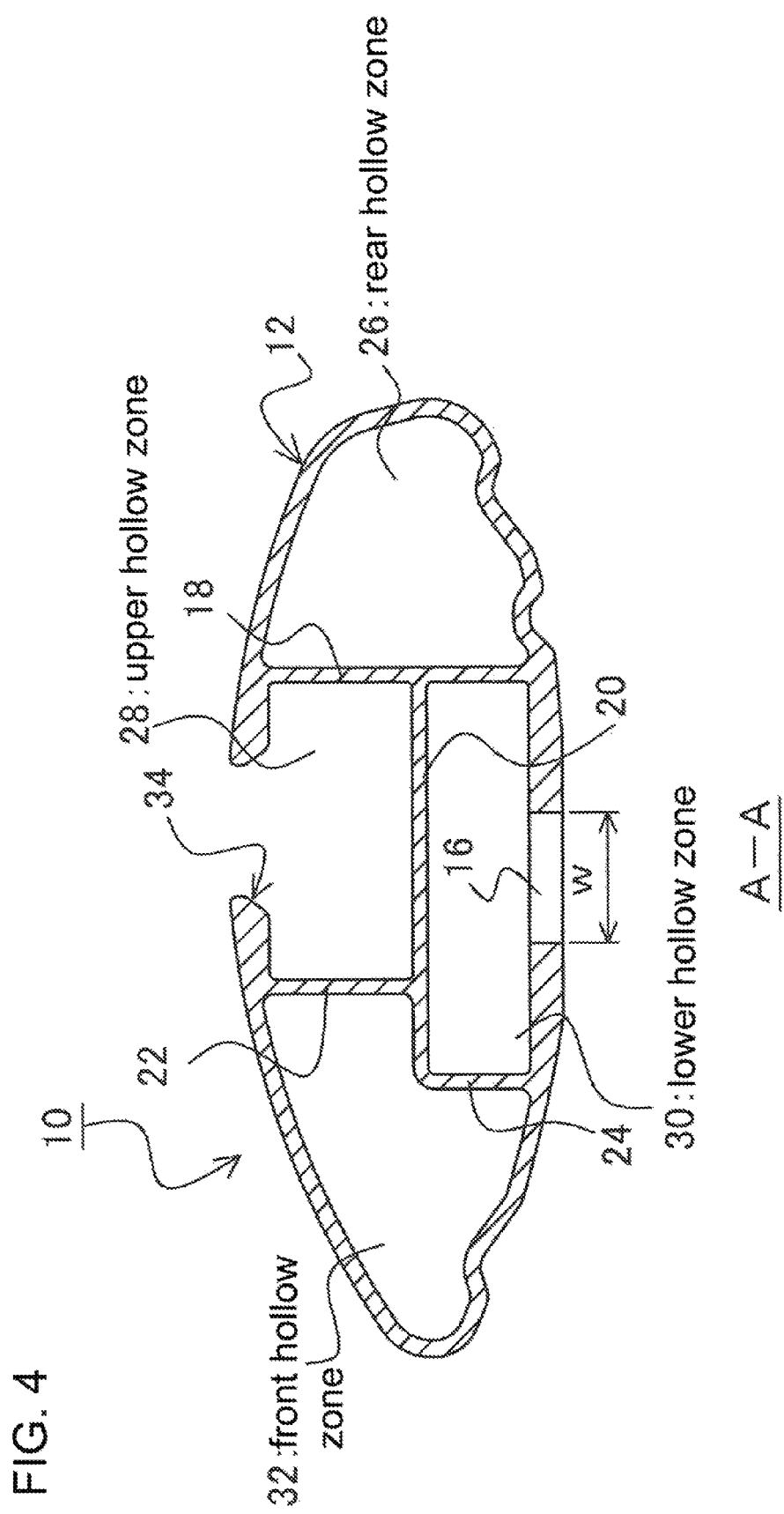
FIG. 4 is a diagram illustrating a cross section taken along a line A-A of FIG. 1 and FIG. 2.
Figure 5:
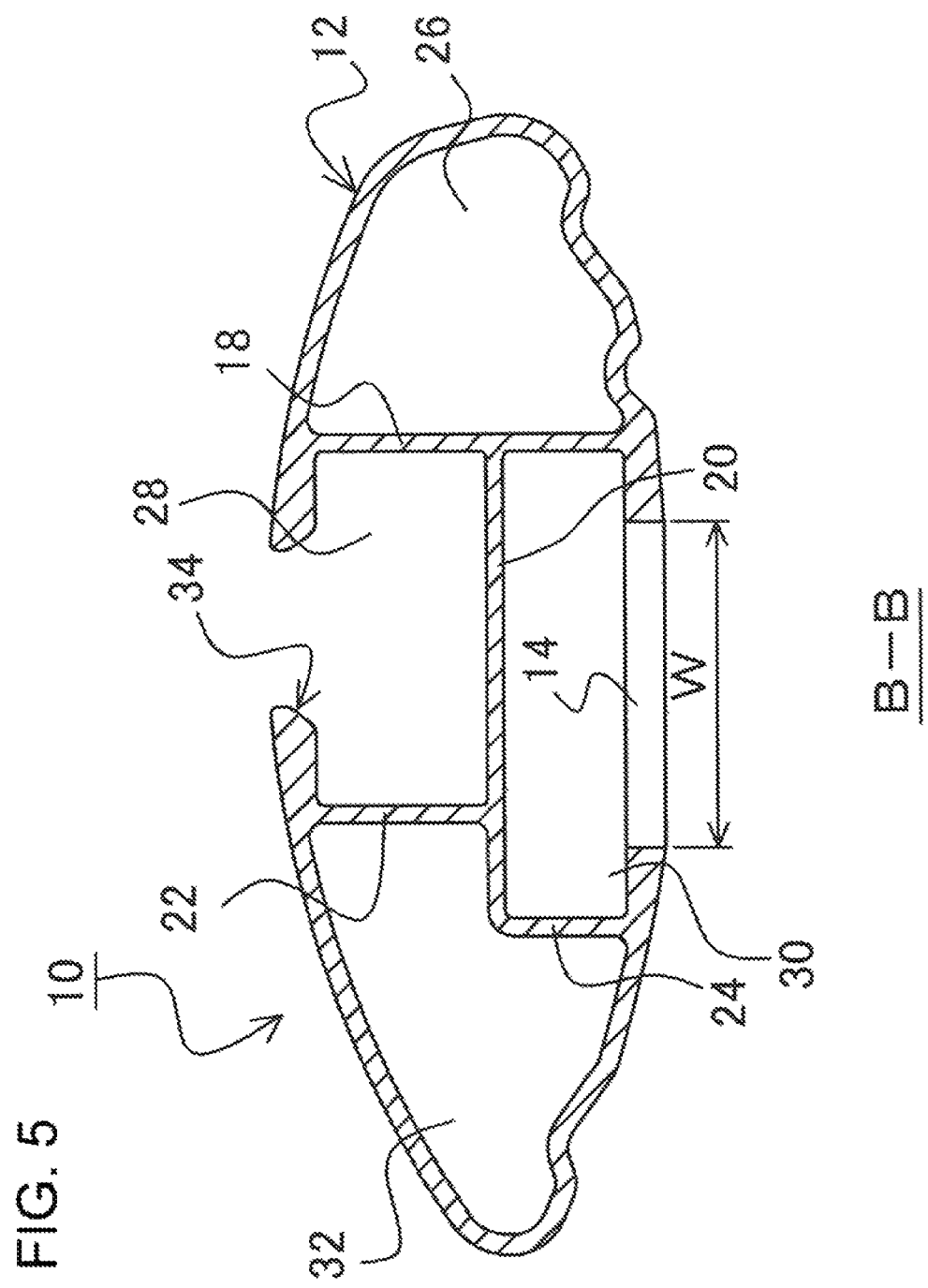
FIG. 5 is a diagram illustrating a cross section taken along a line B-B of FIG. 1 and FIG. 2.

First, a carrier bar according to an embodiment of the invention will be described with reference to FIGS. 1 to 5. It is noted that FIG. 1 is a perspective view illustrating a carrier bar according to an embodiment by focusing on a plane side of the carrier bar, and FIG. 2 is a perspective view illustrating a carrier bar according to an embodiment by focusing on a bottom side of the carrier bar. In addition, FIG. 3 is a side view illustrating a cross section of the carrier bar according to an embodiment. Furthermore, FIG. 4 is a diagram illustrating a cross section take along a line A-A of FIG. 1 and FIG. 2, and FIG. 5 is a diagram illustrating a cross section taken along a line B-B.

The carrier bar 10 according to this embodiment includes, basically, a long shell 12, a plurality of partitioning walls (first partitioning walls 18 to fourth partitioning wall 24) that form hollow zones (rear hollow zone 26 to front hollow zone 32) inside the shell 12, an assembly opening 14, and a positioning opening 16, The shell 12 is an element for defining an exterior shape of the carrier bar 10. The shape of the shell 12 is not particularly limited, but it preferably has an elliptical or streamline shape considering its functional effect. The carrier bar 10 is arranged on top of a roof of a vehicle to stride across the roof. For this reason, if it has a streamline cross-sectional shape against a driving direction, it is possible to reduce aerodynamic resistance or suppress noise generated by an irregular air flow.

The partitioning wall 12 is an element for guaranteeing both a mechanical strength and a light weight of the carrier bar 10. Therefore, each element that can be formed integratedly including the shell 12 is preferably formed of a member having a light weight and capable of providing a predetermined mechanical strength and resistance to heat, wind, rain, dust, and the like. Specifically, the member may include aluminum, alloy containing aluminum as a main component, and the like.

According to this embodiment, the partitioning wall is also an element for shaping the hollow zones (rear hollow zone 26 to front hollow zone 32) in a certain shape. In the carrier bar 10 according to the embodiment, a plurality of hollow zones are partitioned inside the shell 12 by four partitioning walls (first partitioning wall 18 to fourth partitioning wall 24) as illustrating in FIG. 3 which shows a side face structure and FIGS. 4 and 5 which shows a cross-sectional structure. It is noted that, while FIGS. 1 to 5 shows an exemplary carrier bar according to an embodiment, the partitioning shapes of the hollow zones or the number of the partitioning walls may be modified or changed variously, and such changes or modifications are also construed as being within the scope of the this invention.

In the carrier bar 10 according to this embodiment as illustrated in FIGS. 3, 4, and 5, the hollow of the carrier bar 10 is partitioned by the first to fourth partitioning walls 18, 20, 22, and 24 into four hollow zones. The first partitioning wall 18 is a partitioning wall arranged vertically in the hollow zones to partition the rear hollow zone 26 from other zones. The second partitioning wall 20 is a partitioning wall arranged horizontally by using the first partitioning wall 18 as a basal end to partition the hollow into the upper hollow zone 28 and the lower hollow zone 30. In addition, the third partitioning wall 22 is a partitioning wall that links the second partitioning wall 20 to an upper part of the shell 12 to partition the hollow into the upper hollow zone 28 and the front hollow zone 32. Furthermore, the fourth partitioning wall 24 is a partitioning wall that links the second partitioning wall 20 to a lower part of the shell 12 to partition the hollow into the lower hollow zone 30 and the front hollow zone 32.

By arranging the partitioning walls (first partitioning wall 18 to fourth partitioning wall 24) in the hollow of the carrier bar 10, it is possible to set a plurality of hollow zones in any shape or size and guarantee a mechanical strength of the carrier bar.

An attachment trench 34 communicating with the upper hollow zone 28 is provided in the upper part of the shell 12. The attachment trench 34 is a trench for connecting an attachment such as a box, a rack, and a fixing part and is formed across the longitudinal direction of the entire shell 12. The width of the attachment trench 34 is narrower than the width of the upper hollow zone 28. In this configuration, it is possible to fix the attachment in a certain position by arranging a head of a clamp mechanism (not shown) provided in the attachment (not shown) in the upper hollow zone 28 and nipping the shell 12 positioned in the side face of the attachment trench 34 by using the head and the base.

It is noted that a sealing member 36 is preferably disposed in the upper hollow zone 28 and the attachment trench 34 during a non-use state. A level difference on the surface of the shell 12 can be reduced by disposing the sealing member 36 to block the upper hollow zone 28 and the attachment trench 34. As a result, it is possible to prevent noise generated by an irregular wind flow during a vehicle travel or clogging of the trench caused by deposited dust.

An assembly opening 14 and a positioning opening 16 are formed as a pair in a longitudinal end side on the lower surface side of the shell 12 that forms the lower hollow zone 30. The assembly opening 14 and the positioning opening 16 are formed to communicate with each other. The positioning opening 16 is formed to be close to the longitudinal end side of the shell 12 relatively to the assembly opening 14. The longitudinal end of the shell 12 is provided in a terminated end of the positioning opening 16.

The assembly opening 14 has an opening width W and an opening length L into which guide claws 48 and 50 and a head of a clamp chuck 52 of the clamp mechanism 44 provided in the stay 40 described below in more detail can be inserted (refer to FIGS. 6 to 8). In addition, the positioning opening 16 has an opening width w, narrower than the opening width W of the assembly opening 14, into which necks 48b and 50b of the guide claws 48 and 50 and a insert portion 52b of the clamp chuck 52 are slidable, and an opening length l longer than the opening length L of the assembly opening 14 (refer to FIGS. 6 to 8).

In this configuration, the stay 40 can be assembled with the carrier bar 10 by inserting the guide claws 48 and 50 of the clamp mechanism 44 and the heads 48a, 50a, and 52a of the clamp chuck 52 into the assembly opening 14 and then sliding the carrier bar 10 along the positioning opening 16. In addition, since the opening length l of the positioning opening 16 is longer than the opening length L of the assembly opening 14, it is possible to adjust an assembly position of the stay 40 (refer to FIGS. 6 to 8).

Next, a description will be made for the stay 40 assembled with the carrier bar 10 having the aforementioned basic configuration and used to fix the carrier bar 10 to the roof of the vehicle. It is noted that the stay 40 illustrated in FIGS. 6 to 8 is just for exemplifying a preferable configuration, and the stay applicable to the carrier bar 10 according to this invention is not limited thereto. It is noted that FIG. 6 is a plan view illustrating the structure of the stay, FIG. 7 is a cross-sectional view taken along the line C-C of FIG. 6, and FIG. 8 is a diagram illustrating a right side face of the stay.

Figure 6:
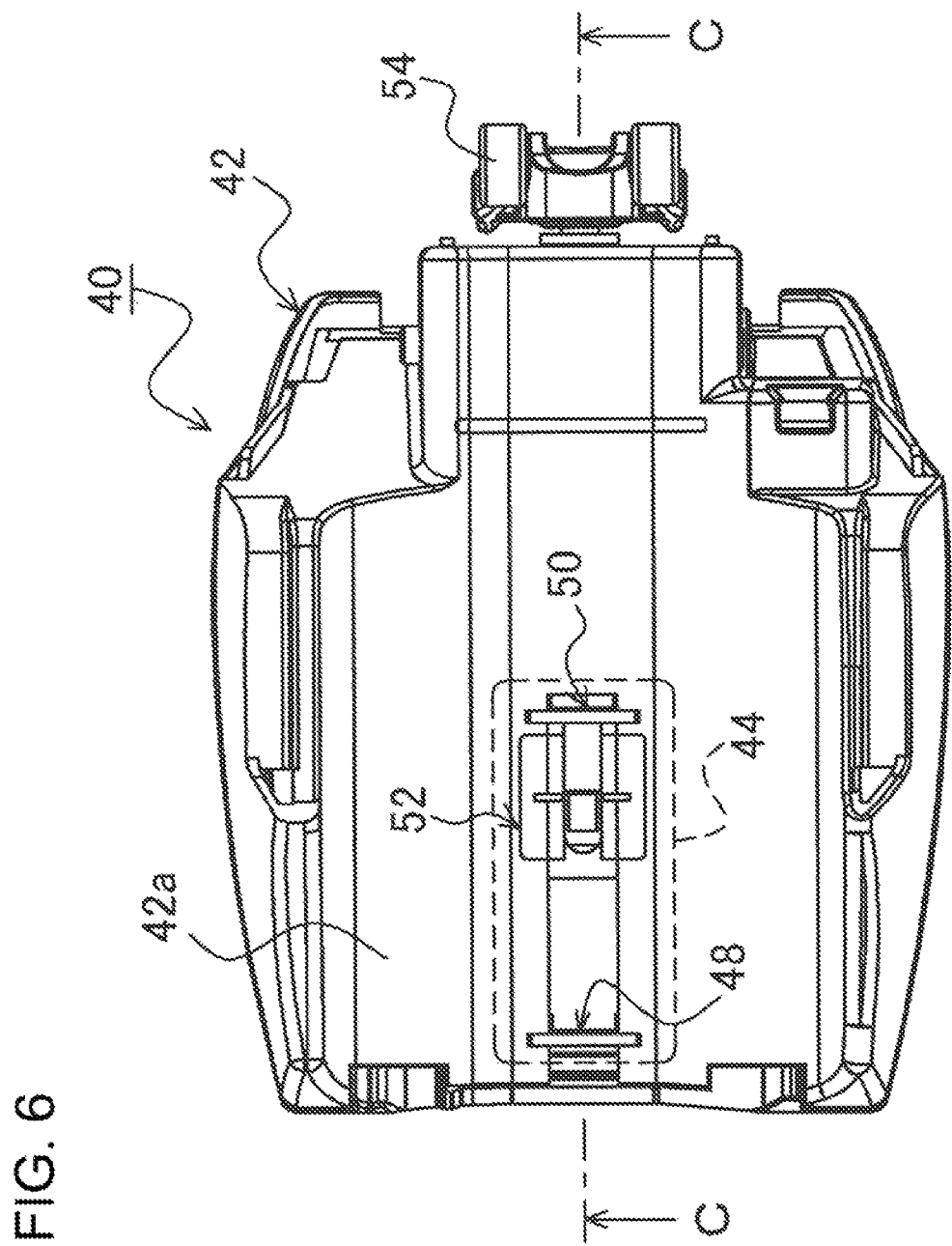
FIG. 6 is a plan view illustrating a stay according to an embodiment.
Figure 7:
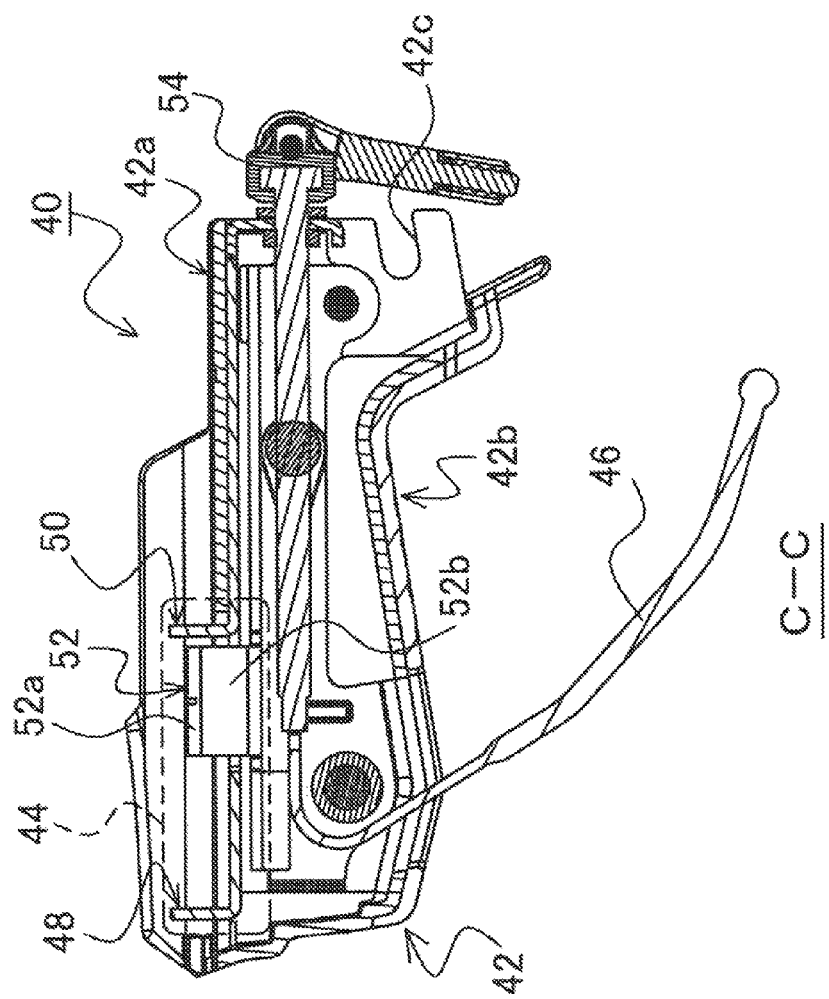
FIG. 7 is a diagram illustrating a cross section taken along a line C-C of FIG. 6.
Figure 8:
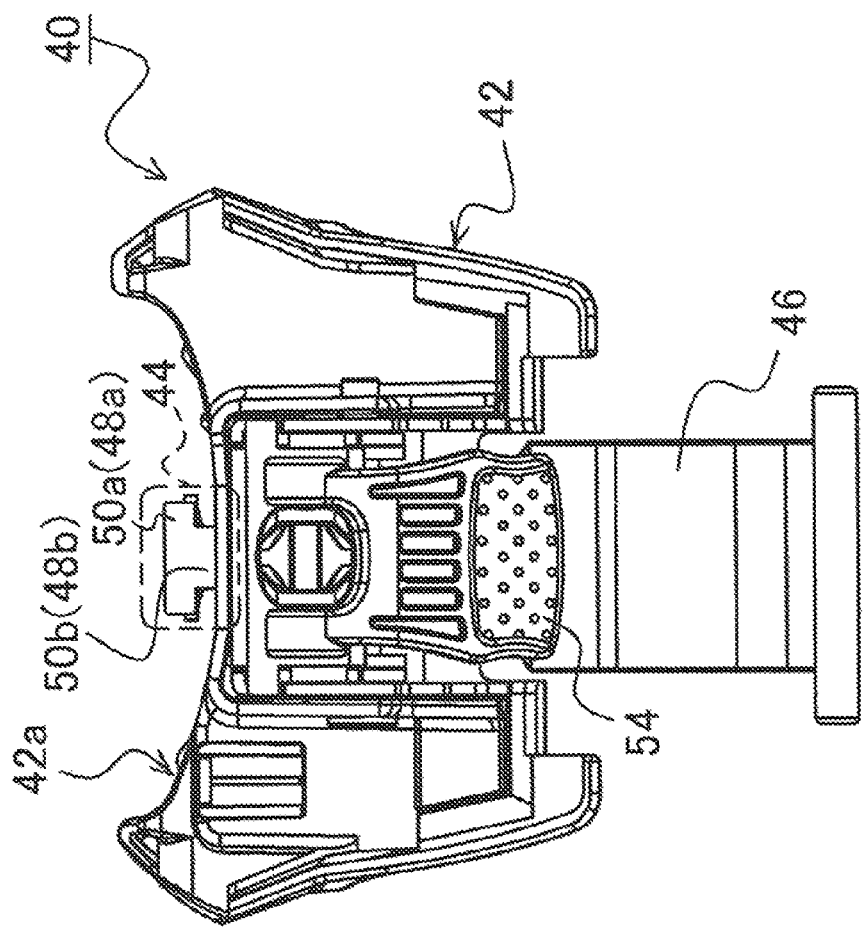
FIG. 8 is a diagram illustrating a right side face of the stay according to an embodiment.

The stay 40 illustrated in FIGS. 6 to 8 has a main body 42, a clamp mechanism 44, and an installation belt 46. The main body 42 mainly includes a carrier bar assembly surface 42a and a vehicle-side assembly surface 42b (assembly surface assembled to a roof rail or the like). The clamp mechanism 44 is arranged to protrude on the carrier bar assembly surface 42a. The clamp mechanism 44 according to an embodiment has a pair of guide claws 48 and 50 and a clamp chuck 52. The pair of guide claws 48 and 50 are arranged to interpose the clamp chuck 52 across the longitudinal direction of the carrier bar assembly surface 42a. Since the pair of guide claws 48 and 50 is arranged across the longitudinal direction of the carrier bar assembly surface 42a, it is possible to prevent the carrier bar 10 and the stay 40 from being twisted when the carrier bar 10 is assembled.

The guide claws 48 and 50 basically have heads 48a and 50a and necks 48b and 50b, respectively. The head 48a and 50a have widths insertable to the assembly opening 14 and wider than that of the positioning opening 16. Meanwhile, the necks 48b and 50b have widths narrower than those of the heads 48a and 50a and the positioning opening 16 and heights by which clamping is not hindered during the assembly work.

The clamp chuck 52 includes a head 52a and an insert portion 52b (constricted portion). The head 52a has a width insertable to the assembly opening 14 and wider than that of the positioning opening 16. Meanwhile, the insert portion 52b has a width narrower than those of the head 52a and the positioning opening 16 in order to enable sinking to the carrier bar assembly surface 42a. In this configuration, the head 52a can be attracted to the carrier bar assembly surface 42a side, so that the shell 12 of the carrier bar 10 can be nipped and fixed in conjunction with the head 52a by using the carrier bar assembly surface 42a as a support surface. The insert portion 52b sinks in synchronization with the behavior of the installation belt 46 described below. That is, as the installation belt 46 is pulled, the insert portion 52b sinks to the carrier bar assembly surface 42a, so that the head 52b serves as a clamp.

The installation belt 46 is an element wound on a roof rail and the like (not shown) disposed in a vehicle roof (not shown) to fix the stay 40 to the roof by hooking its leading edge to a hook portion 42c. It is noted that the installation belt 46 is configured such that it can be tightly fastened by using an adjustment mechanism 54 provided in the main body.

Figure 9:
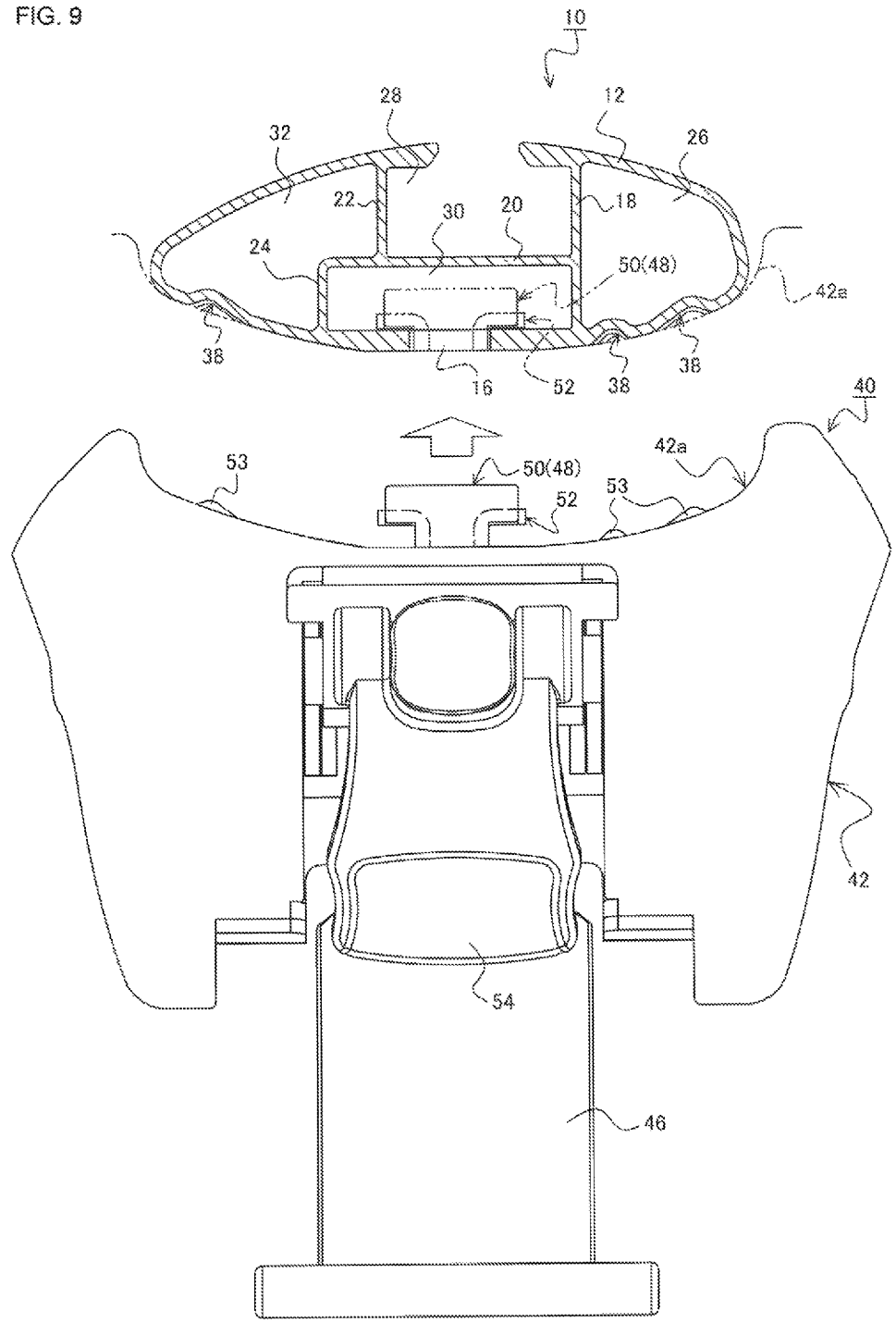
FIG. 9 is a partially cross-sectional side view for describing an engagement relationship between the carrier and the stay according to an embodiment.

The carrier bar assembly surface 42a of the stay 40 according to an embodiment is formed in a concave shape matching the shape of the assembled surface of the carrier bar 10. As a result, it is possible to improve stability when the carrier bar 10 is assembled. In addition, the carrier bar 10 according to an embodiment has an engagement concave portion 38 to face the carrier bar assembly surface 42a of the shell 12 as illustrated in FIG. 9 in detail. Furthermore, an engagement convex portion 53 is provided on the carrier bar assembly surface 42a of the stay 40 to match the engagement concave portion 38 of the carrier bar 10. For this reason, when the carrier bar 10 is assembled to the stay 40, the engagement convex portion 53 is fitted to the engagement concave portion 38. For this reason, it is possible to prevent a deviation or twist in an assembly state between the carrier bar 10 and the stay 40 and maintain an appropriate assembly state.

The carrier bar 10 according to the embodiment may have a lid for sealing the assembly opening 14 and the positioning opening 16. The lid may have, for example, a configuration illustrated in FIGS. 10 and 11. It is noted that FIG. 10 is a front view illustrating the lid, and FIG. 11 is a plan view illustrating a bottom side of the lid.

Figure 10:
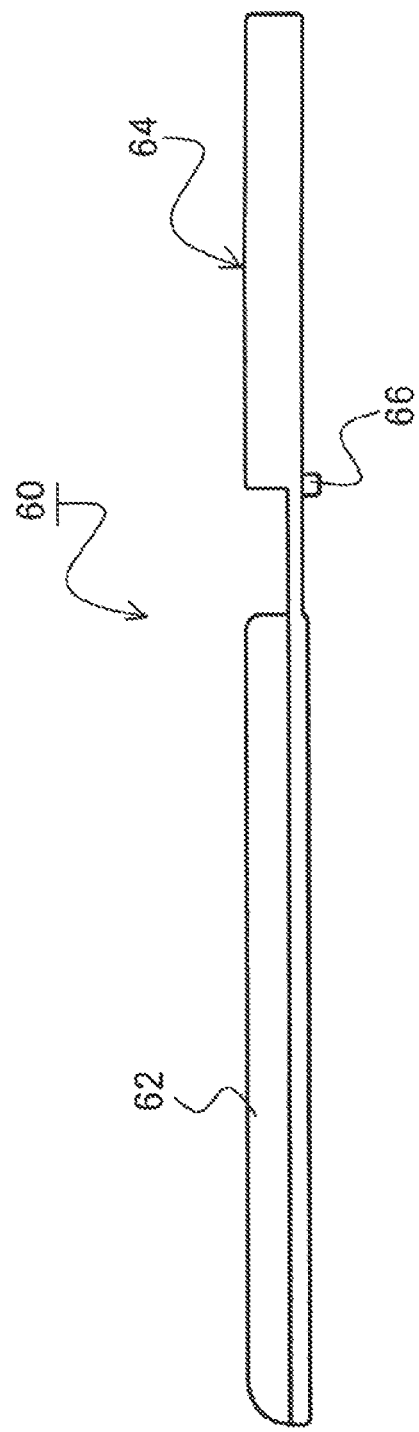
FIG. 10 is a diagram illustrating a front side of a lid according an embodiment.
Figure 11:
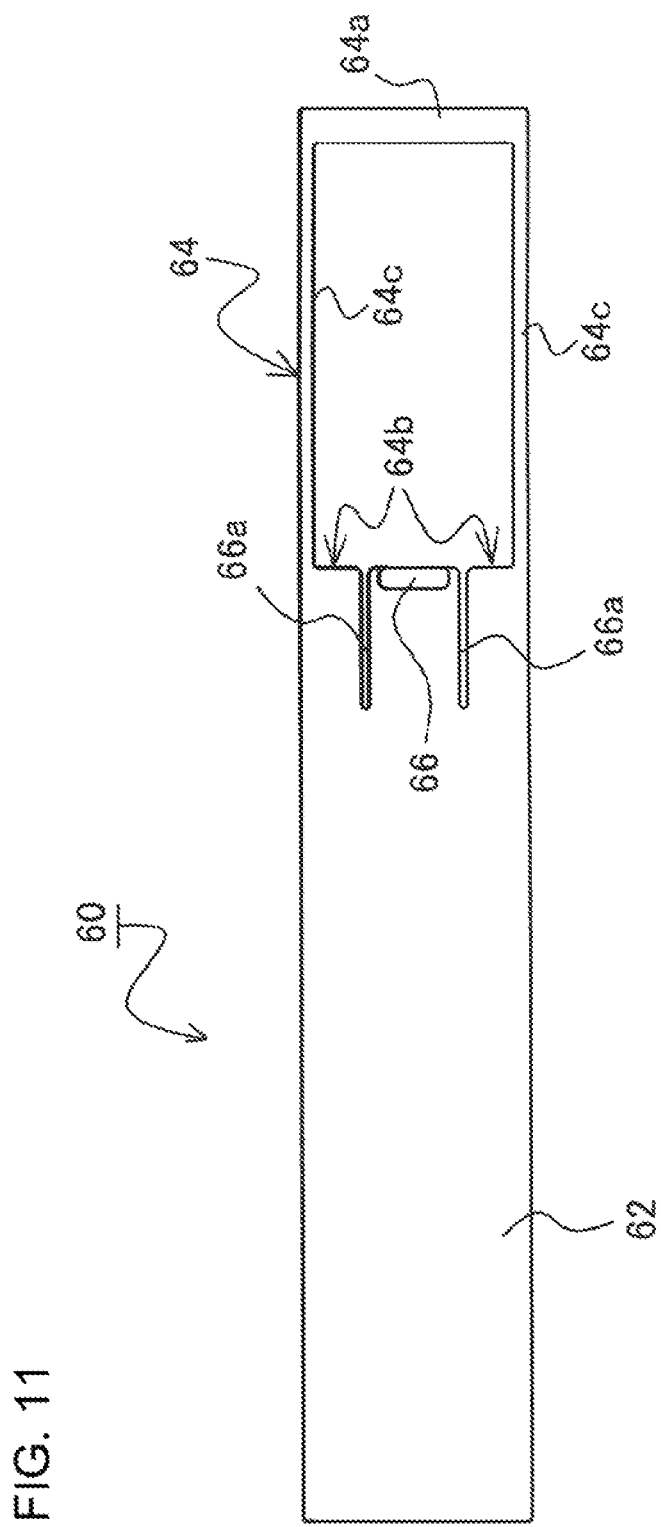
FIG. 11 is a diagram illustrating a bottom side of the lid according to an embodiment.

The lid 60 illustrated in FIGS. 10 and 11 basically includes a sealing portion 62, an engagement portion 64, and a stopper portion 66. The sealing portion 62 has a thickness that can be fitted to the lower hollow zone 30, In addition, at least a width W1 of the sealing portion 62 is wider than the opening width W of the assembly opening 14 so that it can be fitted to the lower hollow zone 30. As a result, it is possible to seal both the assembly opening 14 and the positioning opening 16 without rattling.

The engagement portion 64 is a part of the clamp mechanism 44 engaged with the guide claws 48 and 50. The engagement portion 64 causes the sealing portion 62 to follow the movement of the stay 40. In the lid 60 according to the embodiment, the engagement portion 64 is a frame including a front end plate 64a, a rear end wall 64b, and a connecting portion 64c that connects the front end plate 64a and the rear end wall 64b to each other. In this configuration, as the guide claws 48 and 50 of the clamp mechanism 44 are engaged with the engagement portion 64, the sealing portion 62 slides along the movement of the stay 40 so that it seals the assembly opening 14 or the positioning opening 16.

Figure 12:
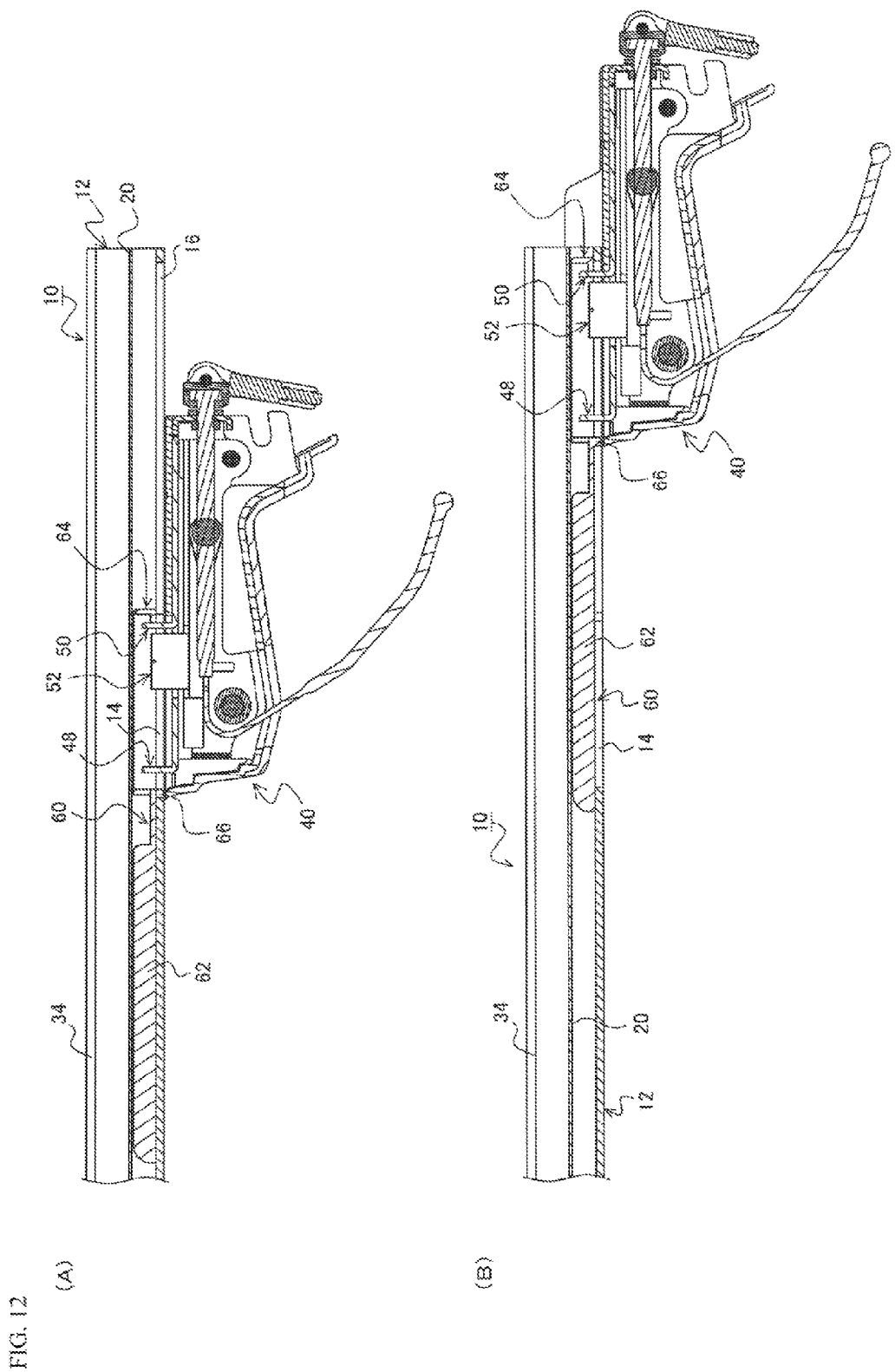

When the lid 60 according to the embodiment is arranged on the lower hollow zone 30, the engagement portion 64 is arranged to match the assembly opening 14, and the sealing portion 62 is arranged to be close to the longitudinal center of the shell 12 relatively to the engagement portion 64 as illustrated in FIG. 12A. The stopper portion 66 is used to determine an initial position of the lid 60 having such an arrangement. The stopper portion 66 is formed to protrude from the plane of the sealing portion 62. In this configuration, the stopper portion 66 is caught in the center-side end portion of the assembly opening 14 so that it is possible to determine the initial position.

The width of the convex portion of the stopper portion 66 is narrower than the opening width w of the positioning opening 16, and the stopper portion 66 overlaps with the positioning opening 16 in the longitudinal direction. In this configuration, when the lid 60 is caused to slide toward the positioning opening 16, the stopper portion 66 passes through the positioning opening 16 as illustrated in FIG. 12B.

In the lid 60 according to the embodiment, slits 66a extending toward the sealing portion 62 are formed in both ends of the stopper portion 66. As a result, it is possible to allow the plate piece of the stopper portion 66 to have a spring-like property. For this reason, the stopper portion 66 is temporarily bent when the lid 60 is inserted from the end of the shell 12 to the lower hollow zone 30. As a result, it is possible to avoid erroneous insertion caused by snagging to the stopper portion 66.

In such a configuration of the carrier bar 10 and its assembly structure, it is possible to perform an assembly work of the stay 40 easily and suitably. Furthermore, it is possible to provide freedom in adjustment of the assembly position of the stay 40 against the carrier bar 10.

Since the assembly opening 14 and the positioning opening 16 are sealed by the lid 60 after the carrier bar 10 is assembled to the stay 40, it is possible to suppress noise caused by an irregular wind flow in the opening. In addition, since the lid 60 is previously incorporated into the lower hollow zone 30 of the carrier bar 10, it is possible to prevent missing or losing of the lid 60 during an assembly work.

Since the engagement portion 64 is provided in the lid 60, and the engagement portion 64 is engaged with the clamp mechanism 44 of the stay 40, the lid 60 slides automatically in synchronization with the movement of the stay 40, so that the sealing portion 62 can seal the assembly opening 14 or the positioning opening 16. As a result, it is possible to prevent a failure to seal the opening.

Figure 13:
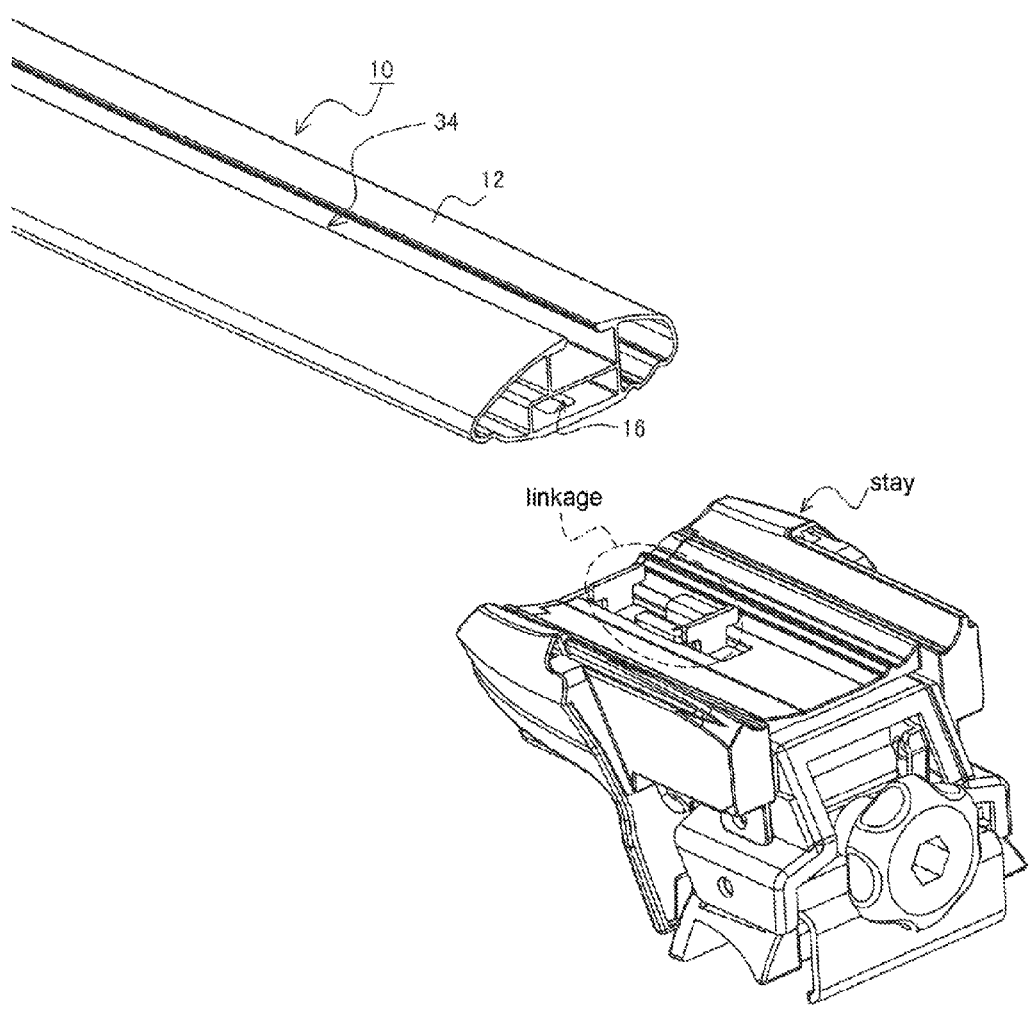
FIG. 13 is a diagram for describing versatility of the stay applicable to the carrier bar according to an embodiment.

Although the description has been made for the stay 40 by way of a specific example in the aforementioned embodiment, any stay can be applied to the assembly structure according to this invention as illustrated in FIG. 13 if it has a clamp mechanism that can be engaged with the carrier bar 10 according to this invention.

Figure 14:
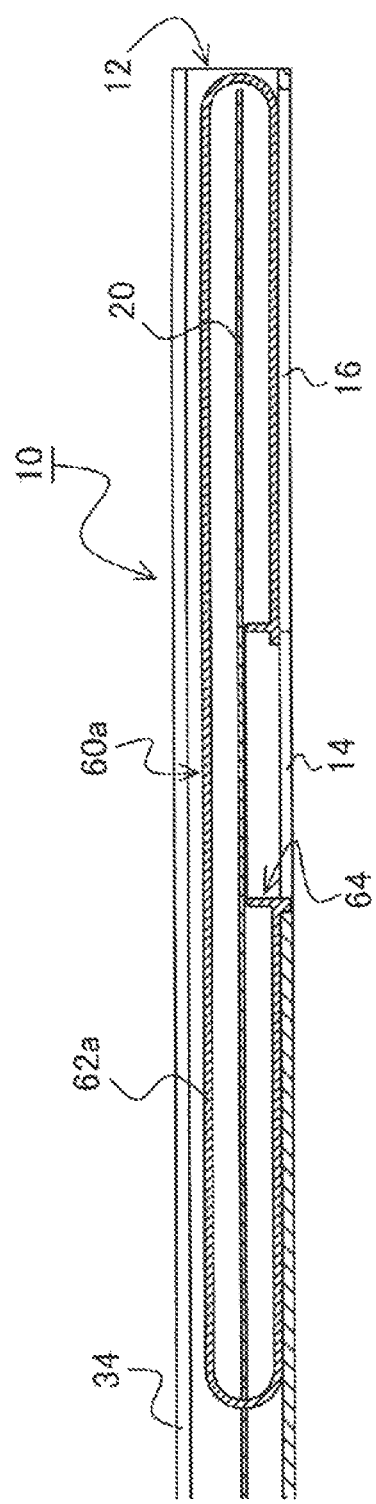
FIG. 14 is a diagram for describing an application of the lid.

In the aforementioned embodiment, the description has been made by assuming that the lid 60 has a flat plate shape and is arranged only in the longitudinal center side of the shell 12 of the carrier bar 10. Alternatively, as illustrated in FIG. 14, the sealing portion 62a of the lid according to this invention may have an endless belt shape. If such a configuration of the lid 60a is employed, the openings (assembly opening 14 and positioning opening 16) other than the engagement portion 64 are maintained in the sealed state even when the stay 40 is not assembled or moved. In addition, when the stay 40 is assembled and moved, the sealing portion 62a having an endless belt shape sequentially rotates and slides to seal each opening.

In the aforementioned embodiment, the description has been made by assuming that the lid 60 (or 60a) is simply a member for sealing the assembly opening 14 or the positioning opening 16. Alternatively, according to this invention, the lid 60 may have other functionalities. Specifically, as illustrated in FIG. 15, in order to relatively recognize a sliding position of the lid 60 against the shell 12, marks such as a scale may be provided in both the shell 12 and the lid 60. It is noted that FIG. 15A is a bottom view illustrating a case where the stay 40 is arranged in the assembly opening 14, FIG. 15B is a bottom view illustrating a case where the engagement portion 64 of the lid 60 entirely enters into an opening range of the positioning opening 16, and FIG. 15C is a bottom view illustrating a case where the lid 60 further slides in order to determine the assembly position of the stay 40.

In the example of FIGS. 15A, 15B, and 15C, the shell 12 side is provided with a reference mark 39 serving as a reference of the positioning in the edge of the assembly opening 14. In addition, the lid 60 is provided with a scale 68 indicating a relative position with respect to the reference mark 39 in the sealing portion 62. In the example of FIG. 15, the scale 68 is set such that the "zero" position is set to a position where the engagement portion 64 entirely enters into the opening range of the positioning opening 16, and the mark of "zero" matches the reference mark 39 (specifically, refer to FIG. 15B).

In this configuration, as the stay 40 slides, a relative position between the scale 68 of the lid 60 and the reference mark 39 of the shell 12 changes, so that it is possible to recognize a relative position of the stay 40 with respect to the carrier bar 10. As a result, it is possible to preset a suitable assembly position of the stay 40 for each vehicle type. If the stay 40 is assembled to comply with this prescribed assembly position, it is possible to reduce a cumbersome effort in the adjustment and rapidly perform the assembly work.

In the aforementioned embodiment, the description has been made by assuming that the reference mark 39 is provided in the edge of the assembly opening 14, and the slide position is recognized on the basis of the reference mark 39 and the scale 68 provided in the lid 60. Alternatively, the opening end of the longitudinal direction of the assembly opening 14 may serve as a reference mark as seen in the carrier bar 10 side. In addition, the scale and the reference mark may be reversely arranged such that the reference mark is provided in the lid 60, and the scale is provided in the edges of the assembly opening and the positioning opening.

In the aforementioned embodiment, the description has been made by assuming that the relationship between the assembly opening 14 and the positioning opening 16 is set such that the positioning opening 16 is arranged to be close to the longitudinal end side of the shell 12 relatively to the assembly opening 14. Alternatively, in the carrier bar 10 according to this invention, the positioning opening 16 may be arranged to be close to the longitudinal center side of the shell 12 relatively to the assembly opening 14. In this case, the terminated end of the positioning opening 16 is formed by the longitudinal center of the shell 12.

REFERENCE SIGNS AND NUMERALS 10 carrier bar,
12 shell,
14 assembly opening,
16 positioning opening,
18 first partitioning wail,
20 second partitioning wall,
22 third partitioning wall,
24 fourth partitioning wall,
26 rear hollow zone,
28 upper hollow zone,
30 lower hollow zone,
32 front hollow zone,
34 attachment trench,
36 sealing member,
38 engagement concave portion,
40 stay,
42 main body,
42a carrier bar assembly surface,
42b vehicle-side assembly surface,
42c hook portion,
44 clamp mechanism,
46 installation belt,
48 guide claw,
48a head,
48b neck,
50 guide claw,
50a head,
50b neck,
52 clamp chuck,
52a head,
52b insert portion,
53 engagement convex portion,
60, 60a lid,
62, 62a sealing portion,
64 engagement portion,
64a leading end plate,
64b rear end wall,
64c connecting portion,
66 stopper portion,
66a slit.

The invention claimed is:

1. A carrier bar comprising:
a shell formed along a longitudinal direction; and
hollow zones formed in a cross-sectional structure,
the carrier bar being assembled with a stay by using a clamp mechanism having a head and a constricted portion to form a base carrier,
wherein the shell has an assembly opening and a positioning opening,
the positioning opening extends toward a longitudinal end or a longitudinal center of the shell by using the assembly opening as a basal end,
a terminated end of the positioning opening is formed by the longitudinal end of the shell when the positioning opening extends toward the longitudinal end,
the terminated end of the positioning opening is formed by the longitudinal center of the shell when the positioning opening extends toward the longitudinal center of the shell,
the assembly opening has an opening width and an opening length into which the head of the clamp mechanism is insertable, and
the positioning opening has an opening width, narrower than that of the assembly opening, along which the constricted portion is slidable, and an opening length longer than that of the assembly opening,
the carrier bar further has a lid that seals a part of the assembly opening and the positioning opening after the carrier bar is installed to the stay,
the lid is arranged to extend from an opening end of the assembly opening that does not communicate with the positioning opening toward a side of a hollow portion that does not seal the assembly opening in the longitudinal direction of the shell, and
the lid is slidable to seal the assembly opening and the positioning opening.

2. The carrier bar according to claim 1, wherein the lid has an engagement portion engaged to the clamp mechanism, and
the lid is slidable along with the clamp mechanism inserted into the assembly opening.

3. The carrier bar according to claim 1, wherein the lid and the shell are provided with marks for recognizing where the lid is placed in positioning means as the lid slides.

4. A carrier bar assembly structure comprising:
a carrier bar having a shell and a lid; and
a stay having a clamp mechanism,
the shell being formed along a longitudinal direction and having an assembly opening and a positioning opening provided to extend toward a longitudinal end or a longitudinal center of the shell,
a terminated end of the positioning opening being formed by the longitudinal end of the shell when the positioning opening extends toward the longitudinal end,
the terminated end of the positioning opening being formed by the longitudinal center of the shell when the positioning opening extends toward the longitudinal center of the shell,
the lid having an engagement portion engaged to the clamp mechanism inserted into the assembly opening,
the lid being arranged oppositely to a direction of forming the positioning opening of the shell with respect to the assembly opening to seal a part of the assembly opening and the positioning opening by sliding toward the positioning opening,
the assembly opening having an opening width and an opening length into which a head of the clamp mechanism is insertable,
the positioning opening having an opening width, narrower than that of the assembly opening, along which a constricted portion is slidable, and an opening length longer than that of the assembly opening,
the clamp mechanism having a head that is insertable into the assembly opening on a carrier bar assembly surface that supports the carrier bar and has a width wider than that of the positioning opening, and a constricted portion that is allowed to intrude into the positioning opening,
wherein the clamp mechanism is engaged with the engagement portion of the lid when it is inserted into the assembly opening, so that the stay slides toward the positioning opening, and sliding of the lid is achieved.

5. The carrier bar assembly structure according to claim 4, wherein the lid and the shell are provided with marks for recognizing where the stay is placed with respect to positioning means as the lid slides.

6. The carrier bar according to claim 2, wherein the lid and the shell are provided with marks for recognizing where the lid is placed in positioning means as the lid slides.

* * * * *